United States Patent
Ichinose et al.

(10) Patent No.: US 7,482,710 B2
(45) Date of Patent: Jan. 27, 2009

(54) POWER GENERATION SYSTEM AND CONTROL METHOD

(75) Inventors: Masaya Ichinose, Hitachiota (JP); Motoo Futami, Hitachiota (JP); Susumu Nakano, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 295 days.

(21) Appl. No.: 11/056,004

(22) Filed: Feb. 14, 2005

(65) Prior Publication Data

US 2005/0206343 A1 Sep. 22, 2005

(30) Foreign Application Priority Data

Mar. 22, 2004 (JP) ............... 2004-082524

(51) Int. Cl.
*H02J 7/00* (2006.01)
(52) U.S. Cl. ........................................... 307/67
(58) Field of Classification Search ............. 307/67; 290/18, 22, 1 A, 36 R; 244/53 A, 58; 322/22
See application file for complete search history.

(56) References Cited

U.S. PATENT DOCUMENTS

| | | | | |
|---|---|---|---|---|
| 5,416,686 A | * | 5/1995 | Azuma et al. ............... 363/37 |
| 5,899,411 A | * | 5/1999 | Latos et al. ................ 244/53 A |
| 6,018,233 A | * | 1/2000 | Glennon ...................... 322/22 |
| 6,037,752 A | * | 3/2000 | Glennon ...................... 322/22 |
| 2004/0140674 A1 | * | 7/2004 | Nguyen et al. ................ 290/52 |

OTHER PUBLICATIONS

Isamu Inoue, "UPS Function Built-in Micro-turbine Power Generation System" Meiden Jiho 2002, No. 2, pp. 14-17.

* cited by examiner

*Primary Examiner*—Michael J Sherry
*Assistant Examiner*—Daniel Cavallari
(74) *Attorney, Agent, or Firm*—McDermott Will & Emery LLP (57) ABSTRACT

A power generation system includes a first unit power generation system having a storage battery, a second unit power generation system having no storage battery and a controller, at a time of starting up of the power generation system, the controller first starts up the first unit power generation system and then starts up the second unit power generation system having no storage battery by supplying electric power generated by the first unit power generation system to the second unit power generation system.

7 Claims, 10 Drawing Sheets

| | SYSTEM 1 | | STORAGE BATTERY UNIT | SYSTEM 2 | | STATUS |
|---|---|---|---|---|---|---|
| | DC/AC CONVERTER | | | DC/AC CONVERTER | | |
| Pr > Psys | AC VOLTAGE CONTROL | | DC VOLTAGE CONTROL | DC VOLTAGE CONTROL | | SHORTAGE OF SYSTEM POWER STORAGE BATTERY DISCHARGING AT MAXIMUM LOAD AC VOLTAGE DROPPING DUE TO POWER SHORTAGE |
| Pr ≒ Psys | AC VOLTAGE CONTROL | | DC VOLTAGE CONTROL | DC VOLTAGE CONTROL | | AC VOLTAGE MAINTAINABLE POWER BALANCE MAINTAINED BY CHARGE/DISCHARGE OF STORAGE BATTERY |
| Pr < Psys | AC VOLTAGE CONTROL | | DC VOLTAGE CONTROL | DC VOLTAGE CONTROL | | EXCESSIVE SYSTEM POWER STORAGE BATTERY CHARGING AT MAXIMUM LOAD AC VOLTAGE RISING DUE TO EXCESSIVE POWER |

FIG.13

POWER GENERATION SYSTEM AND CONTROL METHOD

BACKGROUND OF THE INVENTION

The present invention relates to a power generation system capable of starting up in stand-alone operation and a control method for the power generation system.

In a micro gas turbine system described in a document: Isamu Inoue "UPS Function Built-in Micro-turbine Power Generation System" Meiden Jiho 2002, No. 2, pages 14-17, a plurality of unit micro gas turbine systems are started up in stand-alone operation, independently of a power system for supplying electric power to the micro gas turbine system.

For the stand-alone startup operation, each of the unit micro gas turbine systems is equipped with a power converter system including a storage battery. When power supply to the load is started after outage of the power system, the unit micro gas turbine systems are stopped once and then restarted.

In the above technique allowing the micro gas turbine system start up in stand-alone operation independently of the power system, each unit micro gas turbine system is connected with a storage battery system in parallel at the output end. The DC power from the storage battery is converted by the power converter system to AC power to serve in place of the power system, by which the electric power for starting up the micro gas turbine system is supplied.

In the above micro gas turbine system, a plurality of unit power generation systems, each of which is formed of a combination of a micro turbine system and a power converter for a storage battery, are connected together, allowing all the unit power generation systems to be started up simultaneously. However, each unit power generation system has to be equipped with a storage battery and that drives up the cost of the whole system.

Further, the above technique once stops the unit micro gas turbine systems when the operation mode of the micro gas turbine system is switched to stand-alone operation due to the outage of power system. Thus, the unit micro gas turbine systems can not be restarted quickly and it takes long to supply sufficient electric power to the load since the start of the stand-alone operation. Moreover, each storage battery is required to have a considerably large capacity since the electric power has to be supplied from the storage batteries to the load until the unit micro gas turbines are restarted.

The control mode of the power converter provided with the storage battery remains under AC voltage control until the total output power (total power generation) of unit micro gas turbine systems exceeds power consumption of the load. When the total output power of unit micro gas turbine systems exceeds the load power consumption, the control mode of the power converter including the storage battery shifts to current control. In this case, the balance of electric power for keeping a proper voltage level is maintained only by the current control of the storage batteries and output power control of the unit micro gas turbines, being susceptible to voltage fluctuation caused by variations in the load.

SUMMARY OF THE INVENTION

An object of the present invention is to provide a power generation system including a plurality of unit power generation systems with a storage battery. In the startup of the power generation system, the unit power generation system having the storage battery is first started up and then other unit power generation systems are started up by use of the electric power of unit power generation system which has already been started up.

By the present invention, the whole power generation system can be started up by providing a storage battery to only one unit power generation system, without the need of equipping each of the unit power generation systems with a storage battery. Therefore, the composition of the power generation system can be simplified and costs of the system can be reduced.

Other objects, features and advantages of the invention will become apparent from the following description of the embodiments of the invention taken in conjunction with the accompanying drawings.

DETAILED DESCRIPTION OF THE EMBODIMENTS

Referring now to the drawings, a description will be given in detail of preferred embodiments in accordance with the present invention.

Embodiment 1

In the following, a first embodiment in accordance with the present invention will be described referring to FIGS. 1 through 3. While the following explanation will be given mainly taking a gas turbine power generation system as an example, the embodiment is also applicable to various power generation systems that make preparations for power generation by use of auxiliary machinery power sources like engine generators, fuel cell systems, etc.

Figure 1:
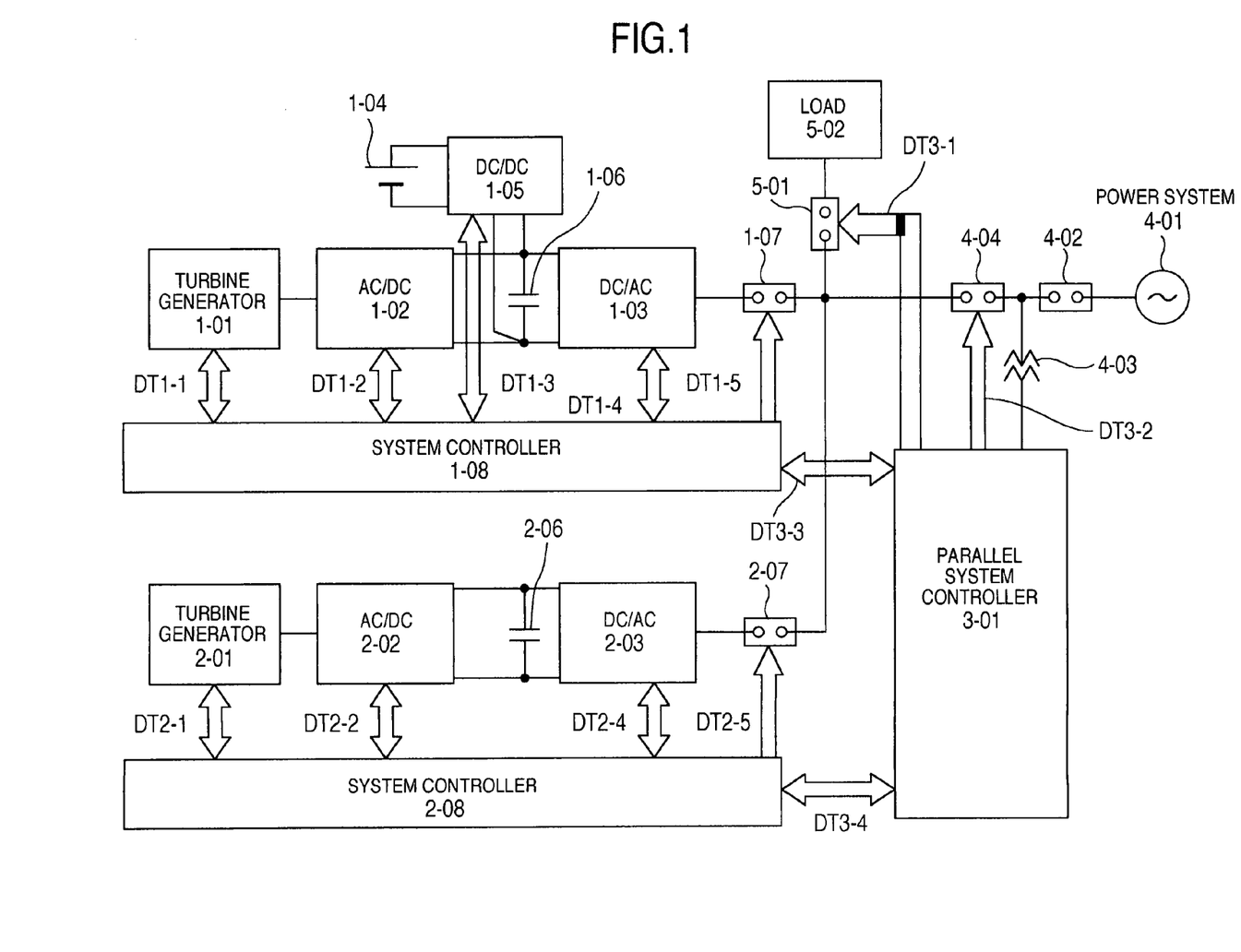
FIG. 1 is a block diagram showing a gas turbine power generation system in accordance with an embodiment of the present invention.

FIG. 1 is a block diagram showing a gas turbine power generation system in accordance with the first embodiment of the present invention. First, the composition and basic operation of the system will be explained referring to FIG. 1. The gas turbine power generation system has a parallel connection structure, in which a plurality of (two in FIG. 1) systems are connected in parallel at the output end.

Although not shown in FIG. 1, each system mainly comprises a turbine generator 1-01, 2-01 (including a combustion chamber, a turbine, a compressor and a generator) and power converters 1-02, 1-03, 2-02, 2-03. Torque generated by the turbine is transmitted to the rotor of the generator and is transduced by the generator into electric power.

An AC/DC converter 1-02, 2-02 which is connected to the stator of the generator converts AC power outputted by the generator into DC power. The DC power is converted again into AC power by a DC/AC converter 1-03, 2-03 and the AC power is outputted to a power system 4-01 of AC 50 Hz/60 Hz.

The AC/DC converter 1-02, 2-02 may either be implemented by a diode rectifier or an IGBT (Insulated Gate Bipolar Transistor) converter for sinusoidal drive. The following explanation will be given taking the sinusoidal drive as an example.

A system controller 1-08 controls the turbine and its auxiliaries and a power converter system (the AC/DC converter 1-02, a DC/DC converter 1-05, the DC/AC converter 1-03 and a breaker 1-07) of a first micro gas turbine system (in the upper part of FIG. 1) by signals DT1-1, DT1-2, DT1-3, DT1-4 and DT1-5.

Similarly to the system controller 1-08, a system controller 2-08 controls the turbine and its auxiliaries and a power converter system (the AC/DC converter 2-02, the DC/AC converter 2-03 and a breaker 2-07) of a second micro gas turbine system (in the lower part of FIG. 1) by signals DT2-1, DT2-2, DT2-3, DT2-4 and DT2-5.

A parallel system controller 3-01 communicates instruction/status signals DT3-3, DT3-4, etc. with the system controllers 1-08 and 2-08 of the micro gas turbine systems while controlling the parallelly connected system or a breaker 4-04 for the parallel system and a breaker 5-01 for a load by outputting control signals DT3-2 and DT3-1.

When the turbine generator 1-01 is generating electric power, the AC/DC converter 1-02 converts the AC output power of the generator into DC power. When the turbine generator 1-01 is not generating electric power, the AC/DC converter 1-02 converts DC power into AC power contrary to the case of power generation and supplies the AC power to the rotor of the generator (motor operation in this case), functioning as a drive unit for revolving the generator, the turbine and the compressor.

As above, the number of revolutions of the generator is increased by the driving power of the AC/DC converter 1-02. When the number of revolutions has reached a prescribed level, combustion for the turbine is started and the motor operation is gradually shifted to generator operation. The AC/DC converter 1-02 supplies the generated power to its DC section.

The DC section of the AC/DC converter 1-02 is connected to a smoothing capacitor 1-06 for removing ripples of current. The smoothing capacitor 1-06 is further connected to a DC section of the DC/AC converter 1-03 which converts DC power into prescribed AC power (50 Hz or 60 Hz).

The DC/AC converter 1-03 converts the generated power into the prescribed AC power (50 Hz or 60 Hz). Before the turbine generator 1-01 starts the power generation, the DC/AC converter 1-03 converts AC power obtained from the power system 4-01 into DC power and supplies the DC power to the AC/DC converter 1-02 as the aforementioned DC power for driving the generator (for the motor operation).

In the system including a storage battery 1-04, the storage battery 1-04 can be connected with the smoothing capacitor 1-06 in two ways: connecting one side of the DC/DC converter 1-05 (for changing the DC voltage level) with the smoothing capacitor 1-06 in the DC section and the other side with the storage battery 1-04.

Figure 7:
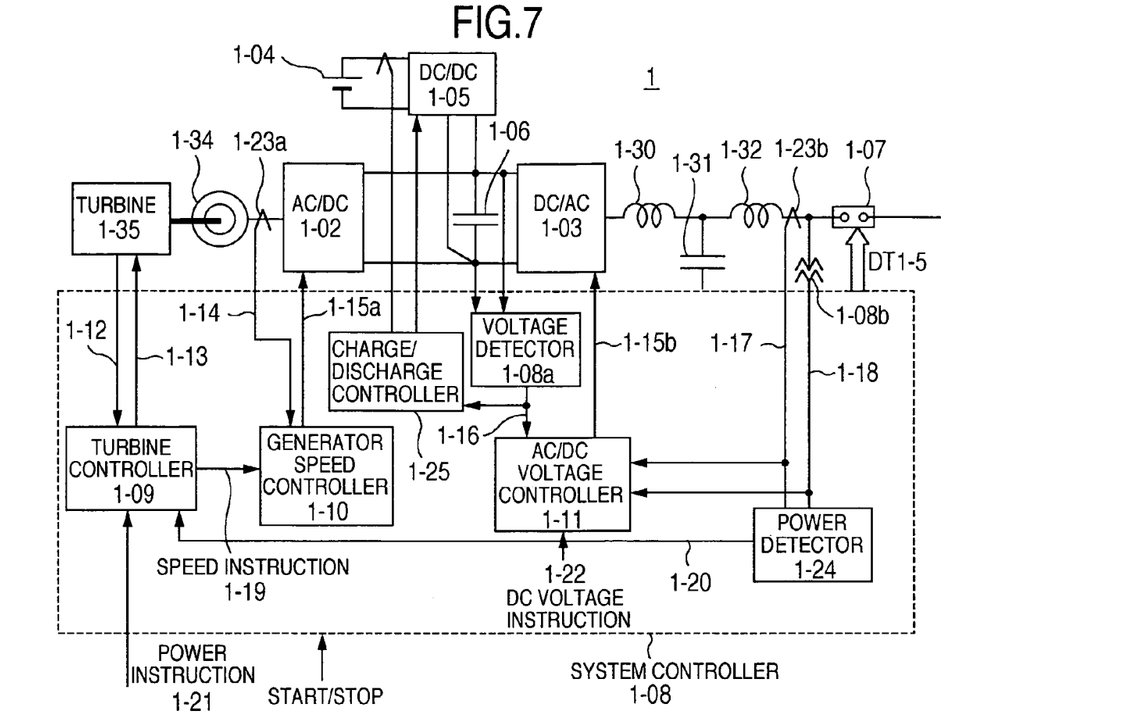
FIG. 7 is a block diagram showing the detailed composition of a system controller shown in FIG. 1.
Figure 8:
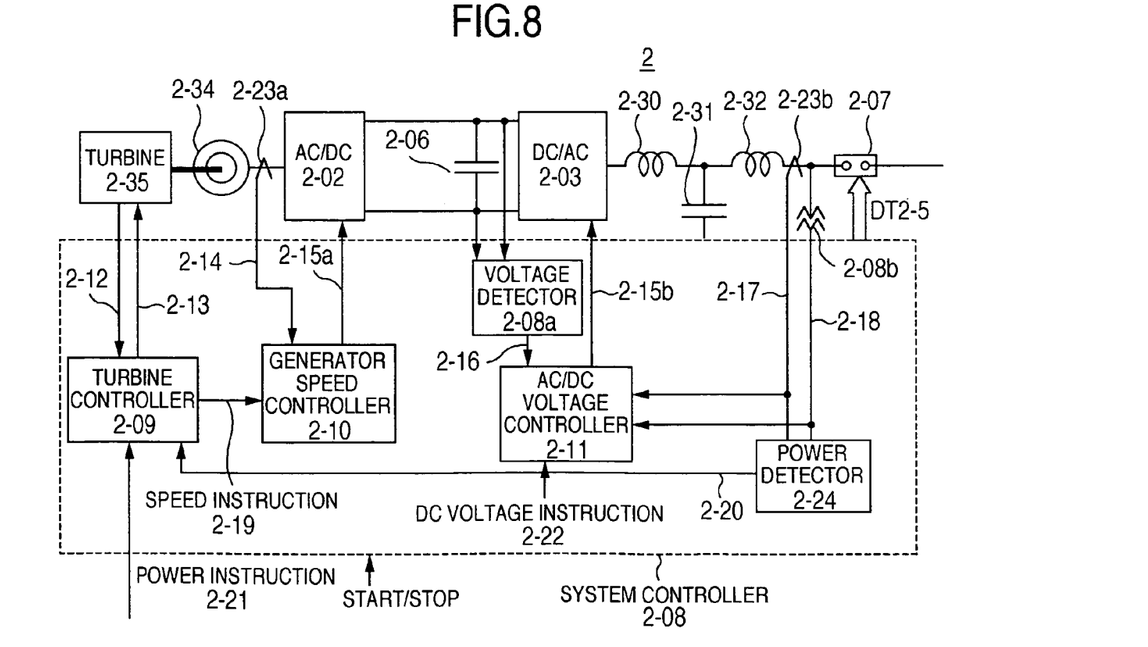
FIG. 8 is a block diagram showing the detailed composition of another system controller shown in FIG. 1.

FIGS. 7 and 8 are block diagrams showing the detailed composition of the system controllers 1-08 and 2-08 shown in FIG. 1 respectively. First, the system 1 will be explained referring to FIG. 7.

The revolving spindle of a turbine 1-35 is connected to the rotor spindle of a generator 1-34 (e.g. permanent magnet generator), while the stator of the generator 1-34 is connected to the AC input side of the AC/DC converter 1-02.

The DC side of the AC/DC converter 1-02 is connected to the DC side of the DC/AC converter 1-03 via the smoothing capacitor 1-06. The AC output side of the DC/AC converter 1-03 is connected to a reactor 1-30 which forms an AC filter for suppressing harmonics. The reactor 1-30 is connected to a capacitor 1-31 and a reactor 1-32 forming the AC filter.

The reactor 1-32 is connected to the power system 4-01 via the breaker 1-07, etc. as shown in FIG. 1. As mentioned above, in the system including the storage battery 1-04, the storage battery 1-04 may be connected in two ways: connecting one side of the DC/DC converter 1-05 with the smoothing capacitor 1-06 in the DC section and the other side with the storage battery 1-04, or connecting the storage battery 1-04 directly with the smoothing capacitor 1-06.

The turbine 1-35 is controlled by a turbine controller 1-09. The AC/DC converter 1-02 is controlled by a generator speed controller 1-10. The DC/AC converter 1-03 is controlled by an AC/DC voltage controller 1-11. The DC/DC converter 1-05 is controlled by a charge/discharge controller 1-25.

The system 2 shown in FIG. 8 has substantially the same composition as the system 1, except that the system 2 does not provide with a storage battery. The revolving spindle of a turbine 2-35 is connected to the rotor spindle of a generator 2-34 (e.g. permanent magnet generator), while the stator of the generator 2-34 is connected to the AC input side of the AC/DC converter 2-02. The DC side of the AC/DC converter 2-02 is connected to the DC side of the DC/AC converter 2-03 via a smoothing capacitor 2-06.

The AC output side of the DC/AC converter 2-03 is connected to a reactor 2-30 which forms an AC filter for suppressing harmonics. The reactor 2-30 is connected to a capacitor 2-31 and a reactor 2-32 forming the AC filter.

The reactor 2-32 is connected to the power system 4-01 via the breaker 2-07, etc. as shown in FIG. 1. The turbine 2-35 is controlled by a turbine controller 2-09. The AC/DC converter 2-02 is controlled by a generator speed controller 2-10. The DC/AC converter 2-03 is controlled by an AC/DC voltage controller 2-11.

FIGS. 9 through 13 are block diagrams showing the detailed composition of the system controller 1-08 employed in this embodiment. The system controller 2-08 of the system 2 is configured substantially the same as the system controller 1-08 except that the system controller 2-08 is not provided with a storage battery, DC/DC converter nor charge/discharge controller, and thus repeated explanation thereof is omitted for brevity.

Figure 9:
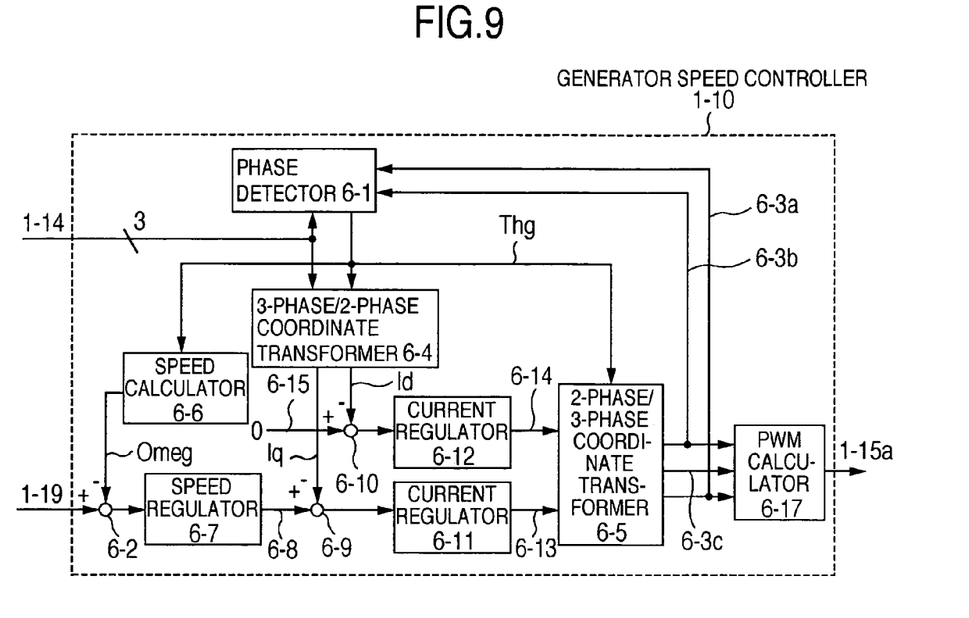
FIG. 9 is a block diagram showing the detailed composition of a generator speed controller shown in FIG. 7.

FIG. 9 shows the detailed composition of the generator speed controller 1-10 for controlling the number of revolutions of the generator 1-34 via the AC/DC converter 1-02. Referring to FIG. 9, the generator speed controller 1-10 receives a speed instruction value 1-19 and a generator current measurement value 1-14. The speed instruction value 1-19 is inputted to a subtracter 6-2.

A phase detector 6-1 receives output voltage instruction values 6-3a and 6-3b for the AC/DC converter 1-02 and the generator current measurement value 1-14, calculates a phase signal Thg regarding induced voltage of the generator by use of a sensorless phase detection method for the generator motor, and outputs the induced voltage phase signal Thg to a three-phase/two-phase coordinate transformer 6-4, a two-phase/three-phase coordinate transformer 6-5 and a speed calculator 6-6.

The speed calculator 6-6 calculates the speed (omeg) from the induced voltage phase signal Thg by the following equation (1):

$$omeg = \Delta\theta/\Delta t \qquad (1)$$

where $\Delta\theta$ denotes the increment of the phase signal Thg and $\Delta t$ denotes time difference.

The subtracter 6-2 obtains the deviation of the calculated speed omeg from the speed instruction value 1-19 and outputs the deviation to a speed regulator 6-7. The speed regulator 6-7 can be implemented by a proportional-integral controller, for example. The speed regulator 6-7 regulates a q-axis current instruction value (torque current instruction value) 6-8 (as its output) so as to eliminate the speed deviation, and outputs the q-axis current instruction value 6-8 to a subtracter 6-9.

The three-phase/two-phase coordinate transformer 6-4 receives the generator current measurement value 1-14 and the induced voltage phase signal Thg, calculates a d-axis current (exciting current component) Id and a q-axis current (torque current component) Iq by the following equation (2), and outputs the d-axis current measurement value Id and the q-axis current measurement value Iq to a subtracters 6-10 and the subtracter 6-9, respectively.

$$\begin{pmatrix} Id \\ Iq \end{pmatrix} = \begin{pmatrix} Iu \cdot \cos(0) + Iv \cdot \cos(2\pi/3) + Iw \cdot \cos(4\pi/3) \\ Iu \cdot \sin(0) + Iv \cdot \sin(2\pi/3) + Iw \cdot \sin(4\pi/3) \end{pmatrix} \qquad (2)$$

$$\begin{pmatrix} \cos(Thg) & \sin(Thg) \\ \sin(Thg) & -\cos(Thg) \end{pmatrix}$$

The subtracter 6-9 obtains the deviation of the q-axis current measurement value Iq from the q-axis current instruction value 6-8 and outputs the deviation to a current regulator 6-11. The current regulator 6-11 regulates a q-axis voltage instruction value 6-13 (as its output) so as to eliminate the q-axis current deviation, and outputs the q-axis voltage instruction value 6-13 to the two-phase/three-phase coordinate transformer 6-5.

Meanwhile, the subtracter 6-10 obtains the deviation of the d-axis current measurement value Id from a d-axis current instruction value 6-15 and outputs the deviation to a current regulator 6-12. The current regulator 6-12 regulates a d-axis voltage instruction value 6-14 (as its output) so as to eliminate the d-axis current deviation, and outputs the d-axis voltage instruction value 6-14 to the two-phase/three-phase coordinate transformer 6-5. The current regulators 6-11 and 6-12 can be implemented by proportional-integral controllers, for example.

The two-phase/three-phase coordinate transformer 6-5 receives the phase signal Thg, the d-axis voltage instruction value 6-14 and the q-axis voltage instruction value 6-13, calculates voltage instruction values 6-3a, 6-3b and 6-3c by the following equations (3) and (4), and outputs the voltage instruction values 6-3a, 6-3b and 6-3c to a PWM calculator 6-17.

$$\begin{pmatrix} Vagr \\ Vbgr \end{pmatrix} = \begin{pmatrix} \cos(Thg) & \sin(Thg) \\ \sin(Thg) & -\cos(Thg) \end{pmatrix} \begin{pmatrix} Vdgr \\ Vqgr \end{pmatrix} \qquad (3)$$

$$\begin{pmatrix} Vugr \\ Vvgr \\ Vwgr \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Vagr \\ Vbgr \end{pmatrix} \qquad (4)$$

The PWM calculator 6-17 calculates and generates a gate signal 1-15a for switching ON/OFF a semiconductor device of the AC/DC converter 1-02 according to pulse width modulation, and outputs the gate signal 1-15a to the AC/DC converter 1-02.

Figure 10:
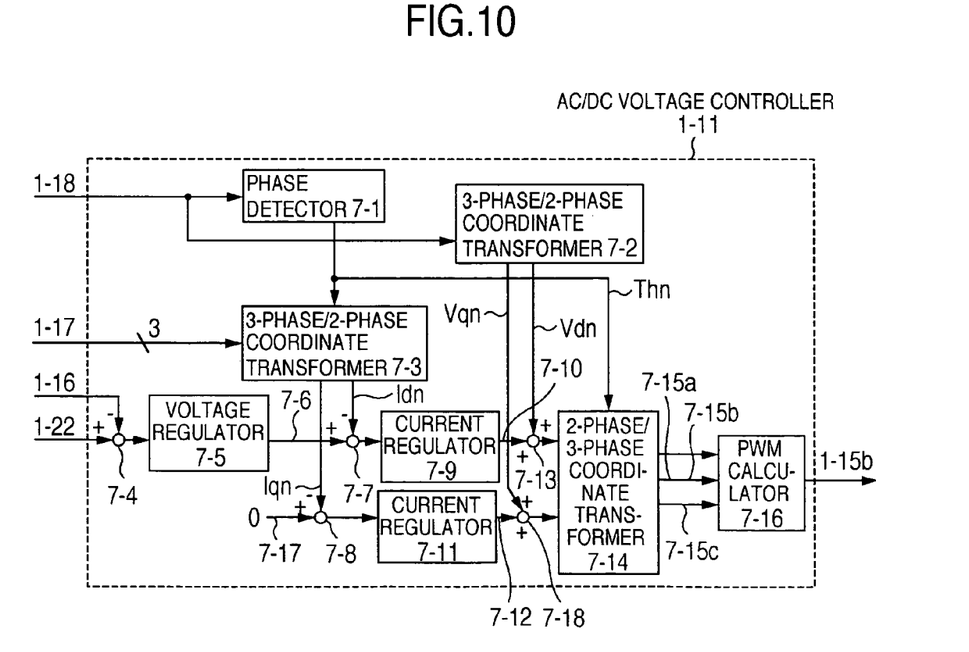
FIG. 10 is a block diagram showing the detailed composition of a DC voltage control unit of an AC/DC voltage controller shown in FIG. 7.

FIG. 10 is a block diagram showing the composition of a DC voltage control unit of the AC/DC voltage controller 1-11 for controlling the DC/AC converter 1-03.

Referring to FIG. 10, the DC voltage control unit of the AC/DC voltage controller 1-11 receives a current measurement value 1-17, a voltage measurement value 1-18, a DC voltage measurement value 1-16 and a DC voltage instruction value 1-22. The AC voltage measurement value 1-18 is inputted to a phase detector 7-1 and a three-phase/two-phase coordinate transformer 7-2.

The phase detector 7-1 generates a phase signal Thn which follows the voltage of the power system 4-01 by the PLL (Phase-Locked Loop) method, for example, and outputs the phase signal Thn to a three-phase/two-phase coordinate transformer 7-3 and a two-phase/three-phase coordinate transformer 7-14.

The DC voltage instruction value 1-22 and the DC voltage measurement value 1-16 are inputted to a subtracter 7-4. The subtracter 7-4 obtains the deviation of the DC voltage measurement value 1-16 from the DC voltage instruction value 1-22 and outputs the deviation to a voltage regulator 7-5.

The voltage regulator 7-5 can be implemented by a proportional-integral controller, for example. The voltage regulator 7-5 regulates a d-axis current instruction value (active current instruction value) 7-6 (as its output) so as to eliminate the DC voltage deviation, and outputs the d-axis current instruction value 7-6 to a subtracter 7-7.

The three-phase/two-phase coordinate transformer 7-3 calculates a d-axis current measurement value Idn (active current) and a q-axis current measurement value Iqn (reactive current) from the current measurement value 1-17 inputted thereto by use of the transformation equation (2), and outputs the d-axis current measurement value Idn and the q-axis current measurement value Iqn to the subtracter 7-7 and a subtracter 7-8, respectively.

The subtracter 7-7 obtains the deviation of the d-axis current measurement value Idn from the d-axis current instruction value 7-6 and outputs the deviation to a current regulator 7-9. The current regulator 7-9 regulates a d-axis voltage instruction value 7-10 (as its output) so as to eliminate the d-axis current deviation, and outputs the d-axis voltage instruction value 7-10 to an adder 7-13.

Similarly, the subtracter 7-8 obtains the deviation of the q-axis current measurement value Iqn from a q-axis current instruction value 7-17 and outputs the deviation to a current regulator 7-11. The current regulator 7-11 regulates a q-axis voltage instruction value 7-12 so as to eliminate the q-axis current deviation, and outputs the q-axis voltage instruction value 7-12 to an adder 7-18. The current regulators 7-9 and 7-11 can be implemented by proportional-integral controllers, for example.

The three-phase/two-phase coordinate transformer 7-2 calculates a d-axis voltage measurement value Vdn (phase component coinciding with system voltage) and a q-axis voltage measurement value Vqn (component orthogonal to the d-axis voltage measurement value Vdn) from the voltage measurement value 1-18 inputted thereto by use of the transformation equation (2), and outputs the d-axis voltage measurement value Vdn and the q-axis voltage measurement value Vqn to the adders 7-13 and 7-18, respectively.

The adder 7-13 adds the d-axis voltage instruction value 7-10 and the d-axis voltage measurement value Vdn together and outputs the sum to the two-phase/three-phase coordinate transformer 7-14. Similarly, the adder 7-18 adds the q-axis voltage instruction value 7-12 and the q-axis voltage measurement value Vqn together and outputs the sum to the two-phase/three-phase coordinate transformer 7-14.

The two-phase/three-phase coordinate transformer 7-14 receives the phase signal Thn and the outputs of the adders 7-13 and 7-18, calculates voltage instruction values 7-15*a*, 7-15*b* and 7-15*c* (as transformer output) by use of the transformation equations (3) and (4), and outputs the voltage instruction values 7-15*a*, 7-15*b* and 7-15*c* to a PWM calculator 7-16.

The PWM calculator 7-16 calculates and generates a gate signal 1-15*b* from the supplied voltage instruction values 7-15*a*, 7-15*b* and 7-15*c* for switching ON/OFF a semiconductor device of the DC/AC converter 1-03 according to pulse width modulation, and outputs the gate signal 1-15*b* to the DC/AC converter 1-03.

Figure 11:
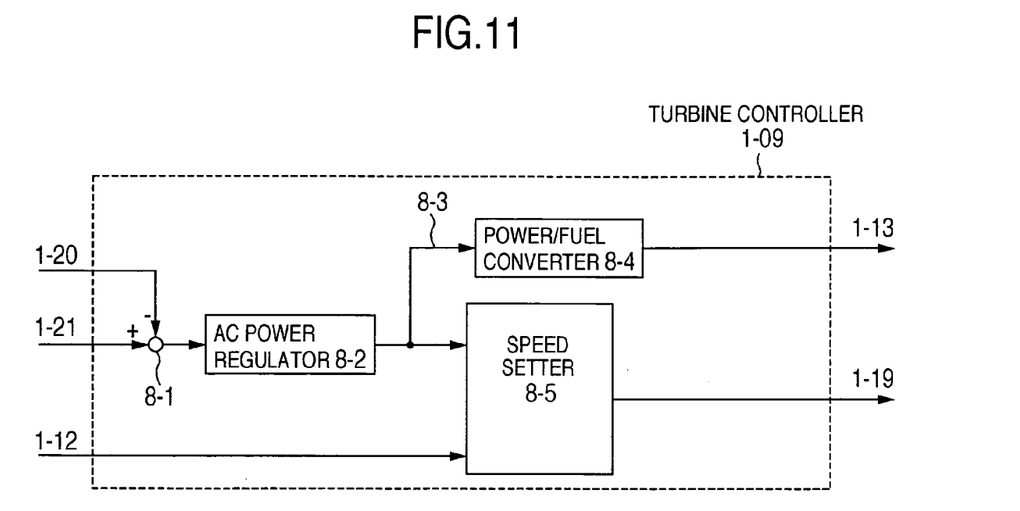
FIG. 11 is a block diagram showing the detailed composition of a turbine controller shown in FIG. 7.

FIG. 11 is a block diagram showing the composition of the turbine controller 1-09. As shown in FIG. 11, the turbine controller 1-09 receives a power instruction value 1-21, a power measurement value 1-20 and state quantities 1-12 like turbine temperature, turbine pressure, etc.

A subtracter 8-1 obtains the deviation of the power measurement value 1-20 from the power instruction value 1-21 and outputs the deviation to an AC power regulator 8-2. The AC power regulator 8-2 can be implemented by a proportional-integral controller, for example. The AC power regulator 8-2 regulates a corrected power instruction value 8-3 corrected value of the power instruction value 1-21 so as to eliminate the power deviation of the measurement value from the instruction value, and outputs the corrected power instruction value 8-3.

The corrected power instruction value 8-3 is inputted to a power/fuel converter 8-4. The power/fuel converter 8-4 obtains a fuel regulation instruction value 1-13 from the corrected power instruction value 8-3 and outputs the fuel regulation instruction value 1-13.

The corrected power instruction value 8-3 is also inputted to a speed calculator (speed setter) 8-5. The speed calculator 8-5 receives the corrected power instruction value 8-3 and the state quantities 1-12, sets the aforementioned speed instruction value 1-19 by referring to operation conditions in each prescribed state, and outputs the speed instruction value 1-19.

Figure 12:
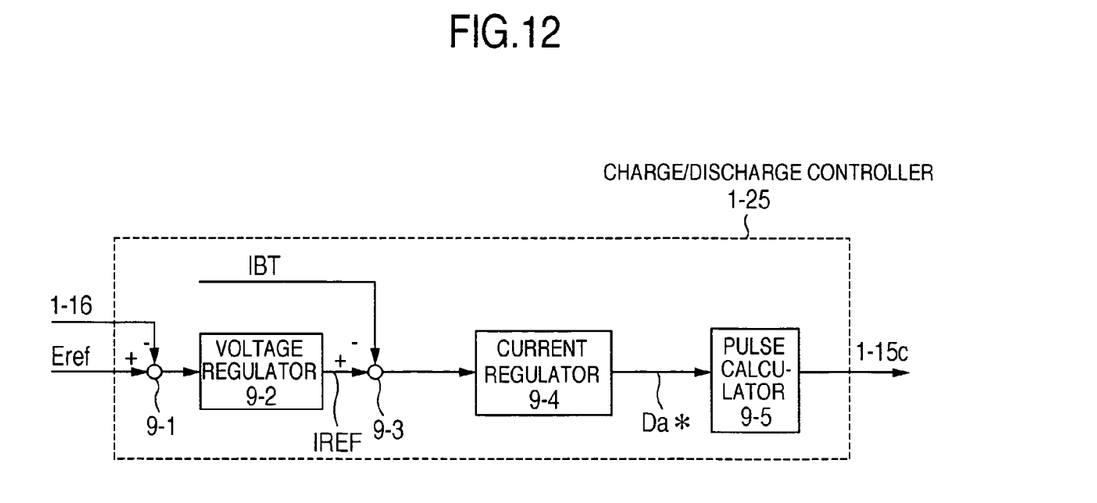
FIG. 12 is a block diagram showing the detailed composition of a charge/discharge controller shown in FIG. 7.

FIG. 12 is a block diagram showing the composition of the charge/discharge controller 1-25 for controlling the DC voltage of the DC/DC converter 1-05. The charge/discharge controller 1-25 receives a current measurement value IBT and the aforementioned DC voltage measurement value 1-16. The DC voltage measurement value 1-16 is inputted to a subtracter 9-1. The subtracter 9-1 obtains the deviation of the DC voltage measurement value 1-16 from a DC voltage instruction value and outputs the deviation to a voltage regulator 9-2.

The voltage regulator 9-2 can be implemented by a proportional-integral controller, for example. The voltage regulator 9-2 regulates a battery current instruction value IREF so as to eliminate the DC voltage deviation, and outputs the battery current instruction value IREF to a subtracter 9-3.

The current instruction value IREF and the current measurement value IBT are inputted to the subtracter 9-3. The subtracter 9-3 obtains the deviation of the current measurement value IBT from the current instruction value IREF and outputs the deviation to a current regulator 9-4.

The current regulator 9-4 regulates an output duty instruction value Da* so as to eliminate the current deviation, and outputs the instruction value Da* to a pulse calculator 9-5. The pulse calculator 9-5 generates a gate pulse signal 1-15*c* for operating the DC/DC converter 1-05 by comparing the instruction value Da* with a triangular wave, and outputs the gate pulse signal 1-15*c* to a gate circuit of the DC/DC converter 1-05.

The charge/discharge controller 1-25, working mainly when the system is operated detached from and independently of the power system 4-01, regulates surplus and shortage of electric power in the independent system by charging/discharging operation.

Figure 13:
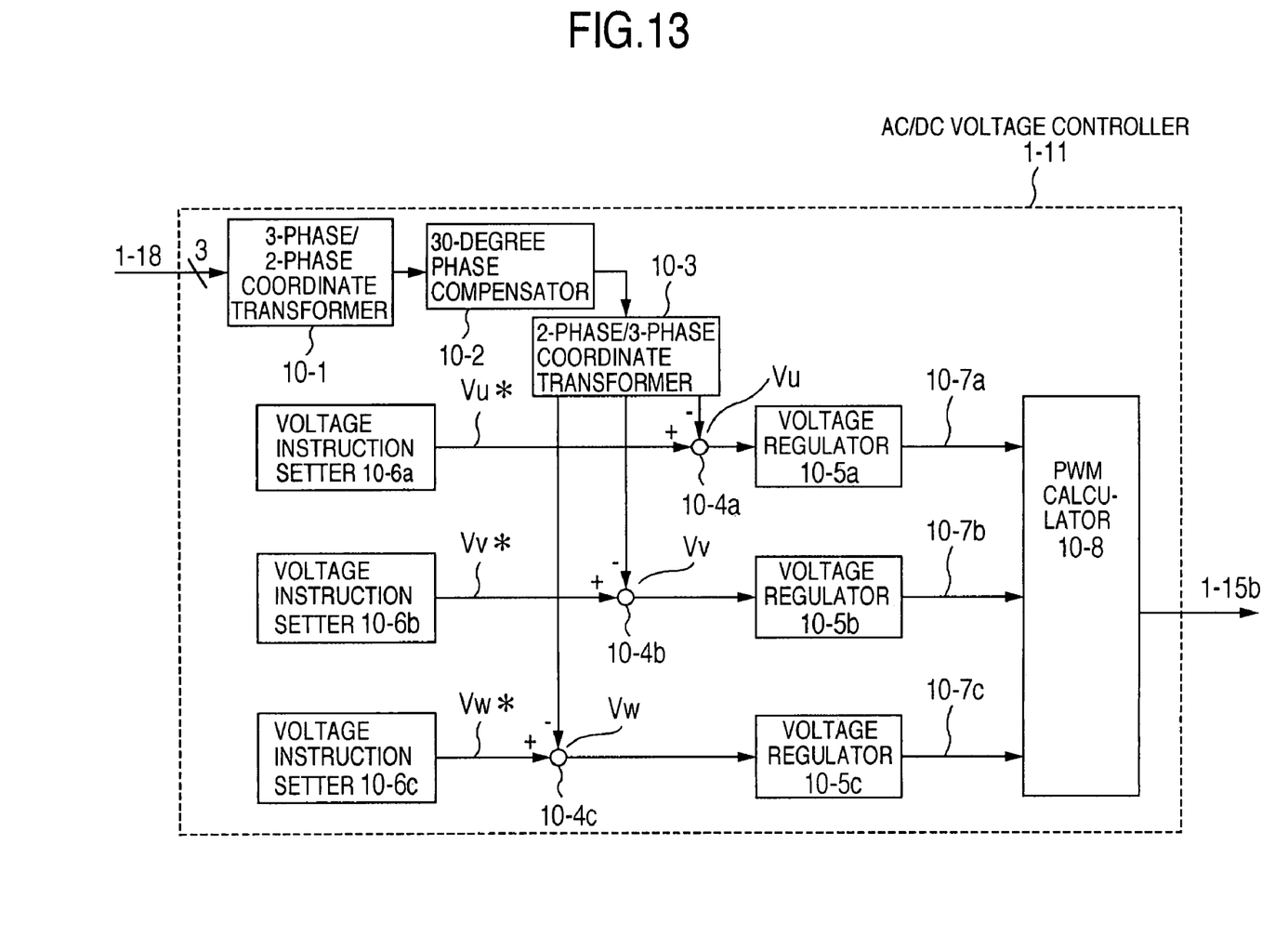
FIG. 13 is a block diagram showing the detailed composition of an AC voltage control unit of the AC/DC voltage controller shown in FIG. 7.

FIG. 13 is a block diagram showing the composition of an AC voltage control unit of the AC/DC voltage controller 1-11 for controlling the DC/AC converter 1-03. The AC voltage control unit works in place of the DC voltage control unit shown in FIG. 10 which works when the system is connected with the power system 4-01.

The AC voltage measurement value 1-18 is inputted to a three-phase/two-phase coordinate transformer 10-1, and the measurement value(s) of line-to-line voltages are transformed into a two-phase voltage vector by the three-phase/two-phase coordinate transformer 10-1 and a 30-degree phase compensator 10-2. The two-phase voltage vector is further transformed by a two-phase/three-phase coordinate transformer 10-3 into three-phase voltages Vu, Vv and Vw.

Voltage instruction setters 10-6*a*, 10-6*b* and 10-6*c* output three-phase AC voltage instruction values Vu*, Vv* and Vw* of a prescribed frequency of the system to subtracters 10-4*a*, 10-4*b* and 10-4*c*, respectively. The subtracters 10-4*a*, 10-4*b* and 10-4*c* also receive the aforementioned three-phase voltages Vu, Vv and Vw, respectively. Each subtracter 10-4*a*, 10-4*b*, 10-4*c* obtains the deviation of each voltage measurement value Vu, Vv, Vw from each voltage instruction value Vu*, Vv*, Vw* and outputs the deviation to each voltage regulator 10-5*a*, 10-5*b*, 10-5*c*.

The voltage regulators 10-5*a*, 10-5*b* and 10-5*c* can be implemented by proportional-integral controllers, for example. Each voltage regulator 10-5*a*, 10-5*b*, 10-5*c* calculates a voltage instruction value 10-7*a*, 10-7*b*, 10-7*c* so as to eliminate the voltage deviation, and outputs the voltage instruction value 10-7*a*, 10-7*b*, 10-7*c* to a PWM calculator 10-8.

The PWM calculator 10-8 calculates and generates a gate signal 1-15*b* from the supplied voltage instruction values 7-15*a*, 7-15*b* and 7-15*c* for switching ON/OFF the semiconductor device of the DC/AC converter 1-03 according to pulse width modulation, and outputs the gate signal 1-15*b* to the DC/AC converter 1-03.

In the following, the operation of the gas turbine power generation system will be described referring to FIGS. 2 and 3. FIG. 2 is a timing chart showing startup operation of a plurality of systems (systems 1 and 2) which are parallelly connected to the power system 4-01. In FIG. 2, the system provided with a storage battery unit including the storage battery 1-14 and the DC/DC converter 1-05 is defined as the system 1, while the other system having no storage battery unit is defined as the system 2.

Figure 2:
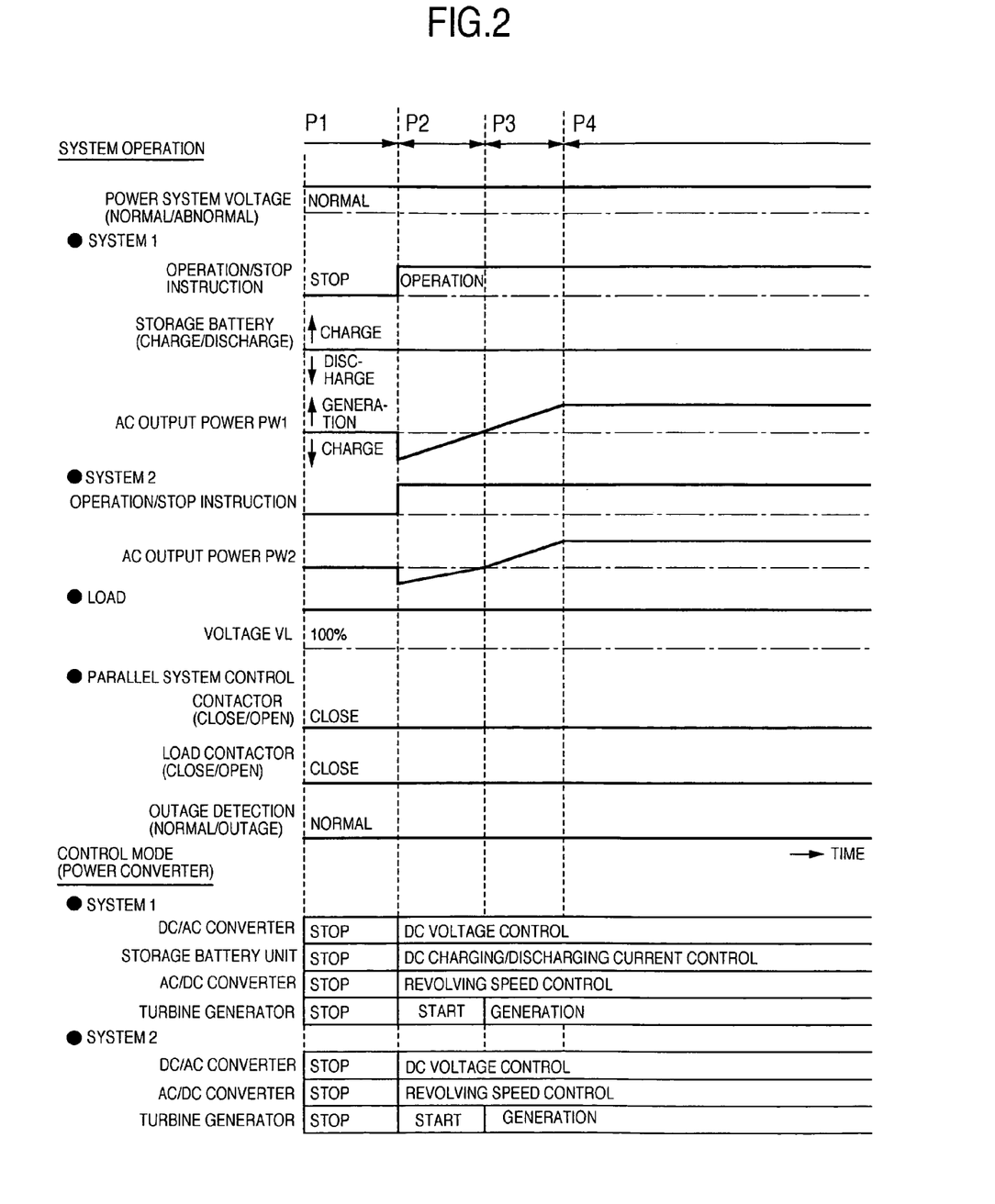
FIG. 2 is a timing chart showing startup operation of the gas turbine power generation system when a power system operating normally is connected thereto.

Referring to FIG. 2, the systems 1 and 2 are stopped in a period P1. In response to an operation instruction issued by the parallel system controller 3-01 to the system 1, the system starts its operation and shifts to a period P2. In the period P2, the DC/AC converter 1-03 is first set to a DC voltage control mode and maintains the DC voltage at a constant level.

Meanwhile, peripheral units of the turbine (auxiliary machinery such as a pump) are started and thereby the turbine and the generator are kept on standby ready to start revolving. Thereafter, the AC/DC converter 1-02 starts revolving the generator (motor) 1-34 by its revolving speed control function, and the compressor and a turbine vane wheel are driven up to a revolving speed allowing the combustion chamber to start combustion.

Subsequently, the combustion chamber starts combustion, by which the gas turbine generates torque, the generator shifts to a power generation mode (period P3), and the output of the gas turbine rises gradually up to a target value. At the point when the power generation level has reached a target value, the startup operation is completed (period P4). The startup operation of the system 2 is the same as the above operation of the system 1.

At the point of the startup, a load 5-02 has already been connected to the power system 4-01 and thus electric power for the load has already been supplied from the power system 4-01. As the gas turbine power generation system is started up and its output power increases gradually, the electric power received from the power system 4-01 decreases.

Meanwhile, the storage battery unit including the storage battery 1-04 and the DC/DC converter 1-05 keeps on monitoring its battery level and carries out current control for charging or discharging of the storage battery (DC charging/discharging current control).

Next, the operation of the parallel system for stand-alone startup, without the connection with the power system 4-01, will be described referring to FIGS. 3 and 4. Similarly to the case of FIG. 2, the system provided with the storage battery unit including the storage battery 1-14 and the DC/DC converter 1-05 is defined as the system 1 and the other system having no storage battery unit is defined as the system 2.

When the power system 4-01 is not connected to the gas turbine power generation system, imbalance between power consumption by the load 5-02 and power generation by the turbine generator causes produces ill effects such as the increase/decrease in the AC voltage, DC voltage, etc. The balancing largely depends on the control mode of the power converter.

The system 1, having the storage battery unit including the storage battery 1-04 and the DC/DC converter 1-05, is capable of adjusting the balance of electric power, therefore, the system 1 operates in a different control mode from the system 2. The system 2, without the storage battery unit, operates in a control mode in which generated power is always outputted to the load 5-02.

Figure 3:
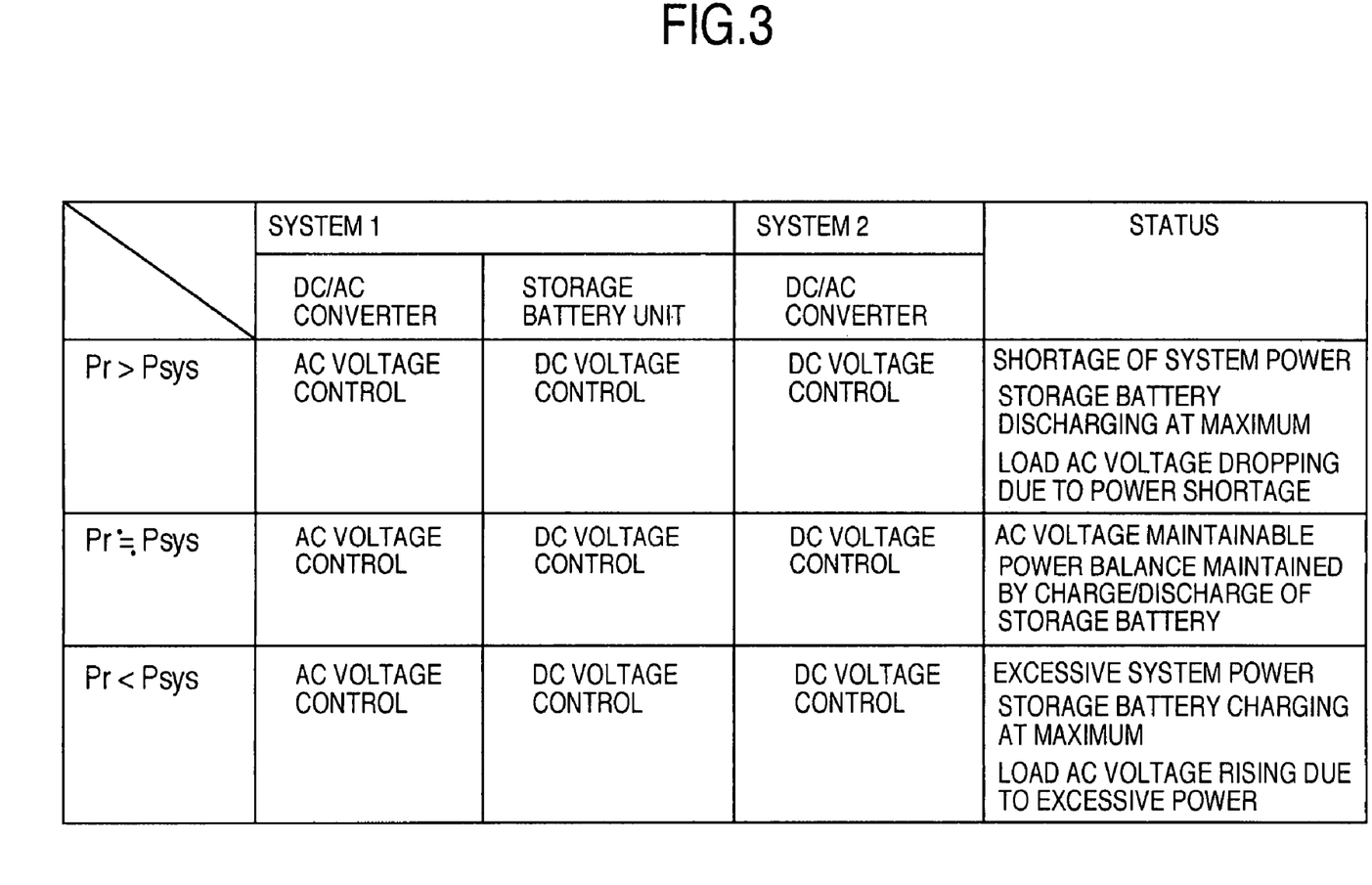
FIG. 3 is a table summarizing relationships among operation modes of each system of the gas turbine power generation system, total power generation and load power consumption.

FIG. 3 is a table summarizing relationships among operation modes of each system (system 1, system 2), total power generation (Psys) and load power consumption (Pr). Since the system 2 always outputs generated power to the output end, the control mode of the DC/AC converter 2-03 is always set to the DC voltage control mode.

When the DC/AC converter 2-03 is in the DC voltage control mode, electric power is automatically outputted to the output end so as to prevent the generated power from increasing the voltage of the DC section.

FIG. 3 explains a mode in which the DC/AC converter 1-03 of the system 1 executes AC voltage control (automatically outputting active/reactive power in order to control the voltage of the load). However, another pattern, letting the DC/AC converter 1-03 execute the DC voltage control and the storage battery unit including the storage battery 1-04 and the DC/DC converter 1-05 execute the AC voltage control, is also possible.

In this case, since the DC/AC converter 1-03 controls the active power only, reactive power necessary for the load has to be further detected and outputted by the DC/AC converter 1-03, in which complicated control is required. In the case of FIG. 3 where the DC/AC converter 1-03 executes the AC voltage control, reactive power for the load 5-02 is automatically supplied, in which the control is simple.

Figure 4:
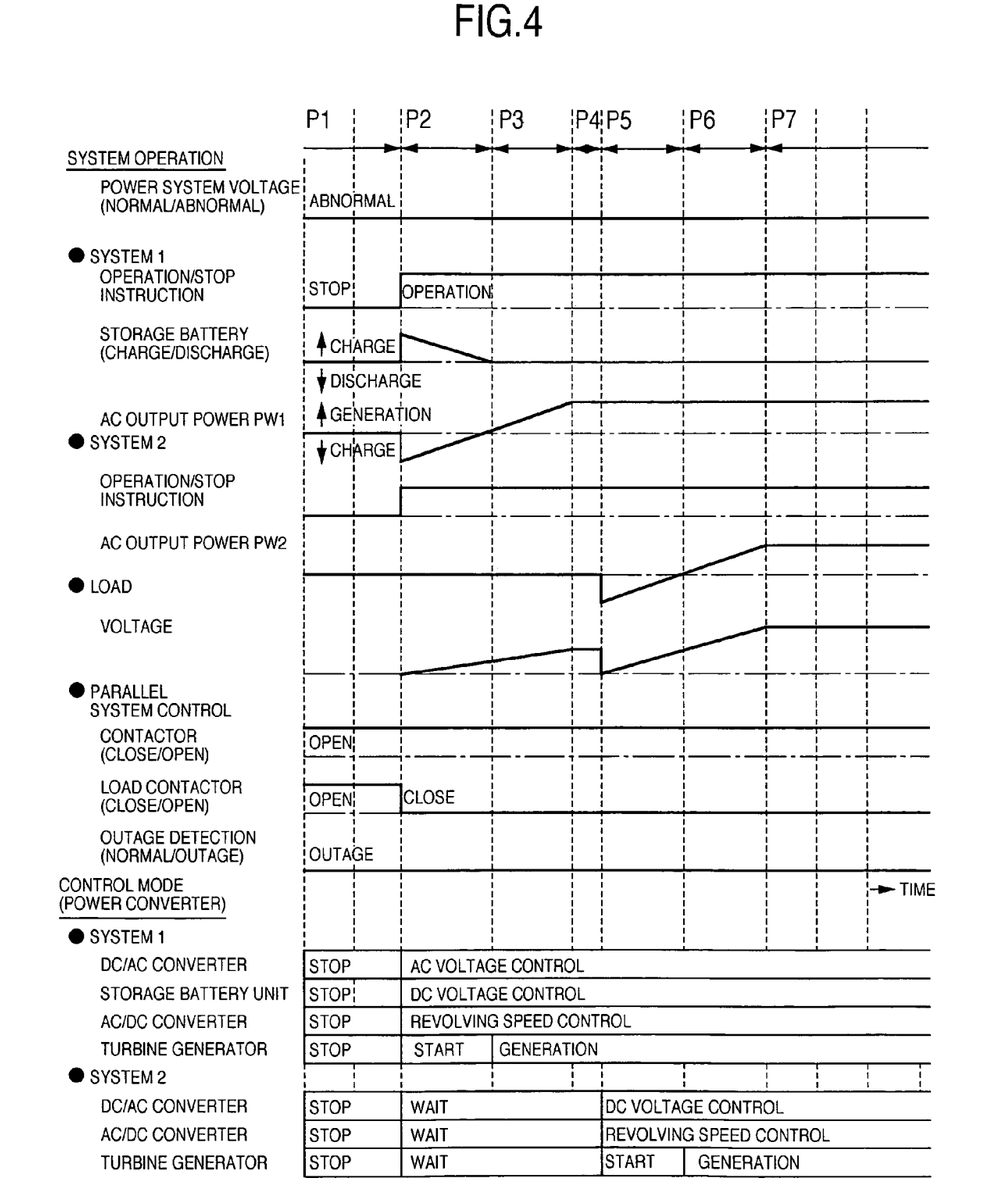
FIG. 4 is a timing chart showing stand-alone startup operation of the gas turbine power generation system without the connection with the power system.

Referring to FIG. 4, the systems 1 and 2 are stopped in a period P1. In response to an operation instruction issued by the parallel system controller 3-01 to the system 1, the system starts its operation and shifts to a period P2. In the period P2, the DC/AC converter 1-03 first maintains the DC voltage at a constant level.

Meanwhile, by letting an auxiliary machinery power source (a power source including a DC/DC converter or a power source including a DC/AC converter, for example) supply electric power by use of DC voltage being maintained constant by the storage battery unit including the storage battery 1-04 and the DC/DC converter 1-05, peripheral units of the turbine (auxiliary machinery such as a pump) are started and thereby the turbine and the generator are kept on standby ready to start revolving. Thereafter, the AC/DC converter 1-02 starts revolving the generator (motor) 1-34 by its revolving speed control function, and the compressor and a turbine vane wheel are driven up to a revolving speed allowing the combustion chamber to start combustion.

Subsequently, the combustion chamber starts combustion, by which the gas turbine generates torque, the generator shifts to a power generation mode (period P3), and the output of the gas turbine rises gradually up to a target value. At the point when the power generation level has reached a target value, the startup operation of the system 1 is completed (period P4).

In this explanation, the load 5-02 has already been connected since the period P2 and the load voltage increases along with the increase of the output power of the system. It is also possible to provide a load switching unit which totally or partially connects the load to the system after the start of power generation by the system.

In this case, out of the electric power outputted by the system to the AC side (50 Hz/60 Hz), surplus power that is not consumed by the load is stored by the storage battery 1-04.

The system 2 starts up after the system 1 has started up. First, in a period P5, the DC/AC converter 2-03 maintains the DC voltage at a constant level.

Meanwhile, by letting an auxiliary machinery power source (a power source including a DC/DC converter or a power source including a DC/AC converter, for example) supply electric power by use of the AC output power of the system 1, peripheral units of the turbine (auxiliary machinery such as a pump) are started and thereby the turbine and the generator are kept on standby ready to start revolving.

Thereafter, the AC/DC converter 2-02 starts revolving the generator (motor) 2-34 by its revolving speed control function, and the compressor and a turbine vane wheel are driven up to a revolving speed allowing the combustion chamber to start combustion.

Subsequently, the combustion chamber starts combustion, by which the gas turbine generates torque, the generator shifts to a power generation mode (period P6), and the output of the gas turbine rises gradually up to a target value. At the point when the power generation level has reached a target value, the startup operation of the system 2 is completed (period P7).

As above, the system 2 starts up by use of the system 1. Since the system 1 maintains its AC voltage, the system 2 can use the system 1 instead of the power system 4-01 and start up using the power generated by the power system 4-01, even without the storage battery 1-04.

After both systems have started power generation, the load 5-02 is connected and thereby electric power is supplied to the load 5-02. The balance of electric power is automatically adjusted by the storage battery 1-04 (buffering operation) if the systems are operated in the control modes defined in FIG. 3.

While an example of a parallel system comprising a system 1 having a storage battery unit including a storage battery 1-04 and a DC/DC converter 1-05 and a system 2 having no storage battery unit has been explained above, similar operation is possible even when the parallel system includes two or more systems 2, by letting the systems start up with certain time delays.

In this case, it is unnecessary to start up the systems on a one-by-one basis. For example, it is possible to start up a system 2 by the electric power of the system 1, starting up systems 3 and 4 by electric power of the systems 1 and 2, and so forth.

Meanwhile, when the parallel system includes two or more systems 1 having a storage battery unit, letting the systems execute the AC voltage control being detached from the power system 4-01 causes passage of reactive current (cross current, intersystem current) among the systems executing the AC voltage control.

To control the reactive current, a cross current suppressor may be provided, or it is possible to let a system 1 execute the AC voltage control while letting other systems 1 execute the DC voltage control implementing current control by the DC/AC converter receiving a power generation level instruction and a charge/discharge current instruction from the system.

The storage battery has to have a capacity capable of starting up the system 1 at least a few times in case of failure during the startup of the system.

By the above embodiment, in a gas turbine power generation system including two or more systems connected in parallel, a system having a storage battery is started up first and thereafter other systems having no storage battery can be started up using electric power of the system that has already been started, by which the number of expensive storage battery units can be reduced.

Further, when the gas turbine power generation system is supplying electric power to the load, in a system having a storage battery, the storage battery unit executes the DC voltage control for balancing the power generation level with the power consumption of the load so as to maintain the AC voltage at a prescribed level and thereby automatically switches into charging/discharging operation, by which voltage fluctuations caused by variations in the load can be suppressed in quick response.

Embodiment 2

Figure 5:
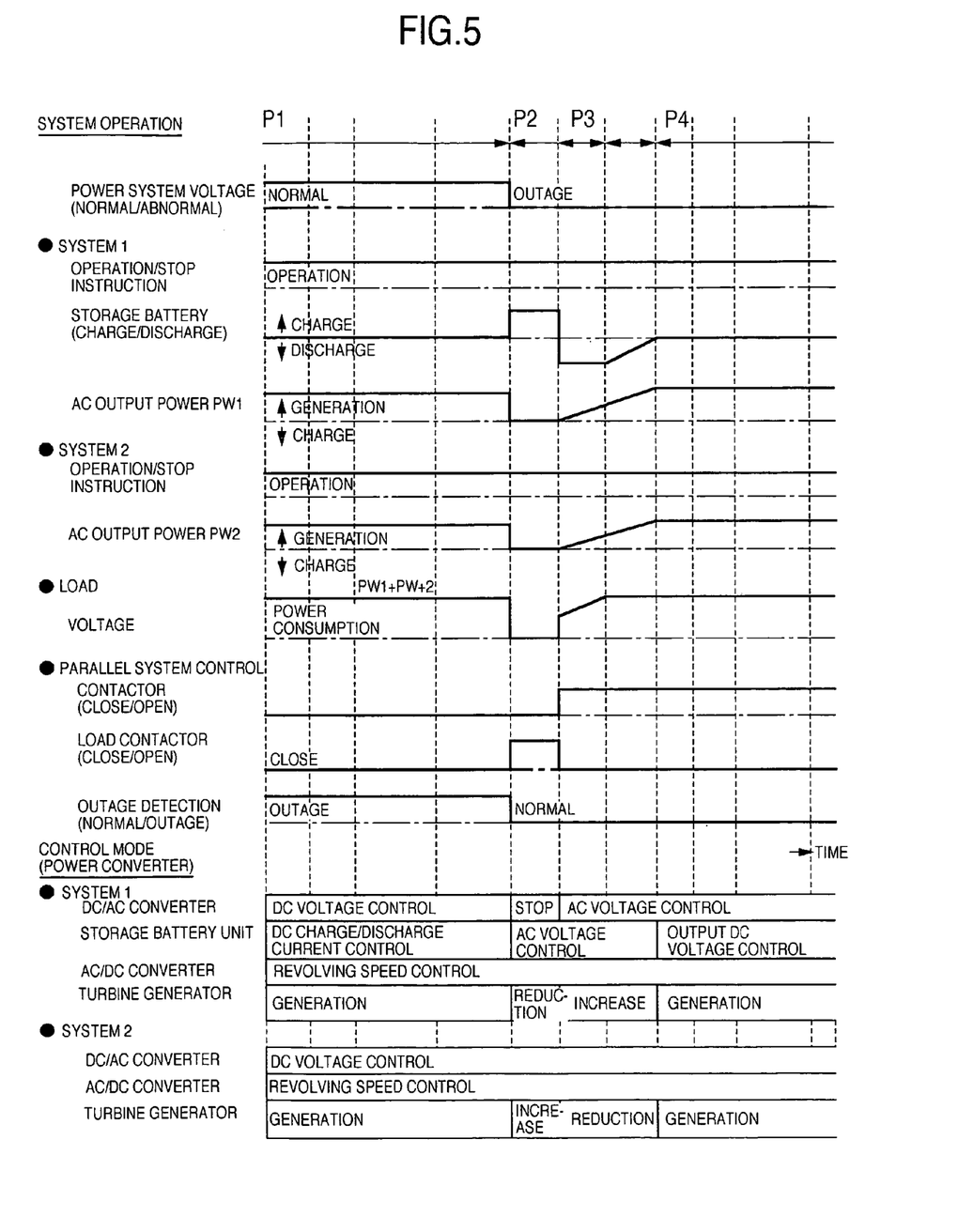
FIG. 5 is a timing chart showing the operation of the gas turbine power generation system in case of outage of the power system.

In the following, another embodiment in accordance with the present invention will be described referring to FIGS. 5 and 6, wherein like reference characters designate like or corresponding parts throughout the views and thus repeated description thereof is omitted for brevity.

In order to supply electric power to the load even when the power system 4-01 can not supply power to the gas turbine power generation system due to abnormality like power outage (periods P2-P4), it is possible to cut the gas turbine power generation system and the load away from the power system 4-01 so as to let the gas turbine power generation system supply power to the load and thereafter connect the gas turbine power generation system and the load to the power system 4-01 when its abnormality has been eliminated.

A method for supplying electric power to the load in case of outage of the power system 4-01 will be described with reference to FIGS. 5 and 6. First, the operation of the gas turbine power generation system will be explained referring to FIG. 5. When the system detects power outage, the parallel system controller 3-01 outputs an opening instruction to a contactor which is placed at a connection to the power system 4-01 while outputting a reduction instruction to the systems 1 and 2 so as to reduce the electric power generated power generation level.

The systems 1 and 2 which received the reduction instruction drop the amount of fuel as much as possible and thereby reduce the power generation level. In this case, the system 1 is provided with the storage battery unit including the storage battery 1-04 and the DC/DC converter 1-05.

Therefore, the output level does not necessarily have to be reduced to the level corresponding to the load since surplus power is stored in the storage battery without the need of reducing the power generation level. However, reducing the power generation level is preferable so that the storage battery will not be charged too much.

When the reduction instruction is received by the systems 1 and 2, the AC/DC converter 1-02 carries out the revolving speed control and changes the number of revolutions (revolving speed) of the generator as needed in order to reduce the output.

In the case where abnormality (power outage) of the power system 4-01 is detected, the DC/AC converters 1-03 and 2-03 can be operated in two ways: once stopping the DC/AC converters 1-03 and 2-03 or letting the DC/AC converters 1-03 and 2-03 continue operating while reducing the output levels.

The case where the DC/AC converters 1-03 and 2-03 are not stopped will be explained below referring to FIG. 5.

The system 1 starts reducing the power generation level while switching the control mode of the DC/AC converter 1-03 to AC voltage control using a voltage phase measurement value before the outage and switching the control mode of the storage battery unit into the DC voltage control.

Until the breaker 4-04 opens and thereby the power system 4-01 is cut off, the system 1 is subject to voltage variation of the power system 4-01 and discharges electricity to the power system 4-01 when its voltage drops. Since overcurrent might occur in such cases, the AC voltage instruction values are reduced as the discharging current increases.

After the breaker 4-04 opens, the voltage of the load 5-02 can be controlled by the DC/AC converter 1-03 of the system 1. The voltage in this state changes depending on the balance between the generated power and the load power consumption Pr as explained referring to FIG. 3.

In the case of stand-alone operation cut off from the power system 4-01, a means for suspending all or part of the load 5-02 e.g. load breaker 5-01 becomes necessary. After the breaker 4-04 opens and thereby the power system 4-01 is cut off, the gas turbine power generation system can operate stably in the operation mode explained referring to FIG. 4.

The system 2 reduces the power generation level, without the switching of the control mode. Since the system 2 outputs the generated power to the AC end, surplus power that is not consumed by the load can increase the AC voltage. However, the DC/AC converter 1-03 of the system 1 has been set to the AC voltage control mode as mentioned above and thus the surplus power is stored by the storage battery unit of the system 1 including the storage battery 1-04 and the DC/DC converter 1-05.

After the breaker 4-04 opens, the reduced power generation level is increased gradually, and thereafter the power generation level is regulated so that charging/discharging current of the storage battery 1-04 will be small. The charging/discharging current and the battery level of the storage battery 1-04 can be controlled by setting the total power generation lower than the load power consumption when the battery level should be reduced while setting the total power generation higher than the load power consumption when the battery level should be raised.

Next, a case of a stoppage of the DC/AC converter 2-03 will be explained below.

In such a case where the DC/AC converter 2-03 of the system 2 suddenly stops before the power generation level is reduced, the generated power supplied to the DC section loses its outlet, by which the voltage of the smoothing capacitor 2-06 in the DC section increases excessively.

Even if the AC/DC converter 2-02 is also stopped, the generator 2-34 can not generate electric power commensurate with the torque of the turbine, by which the number of revolutions becomes too high and the system 2 suspends its operation by stopping the combustion by cutting off the fuel supply to the combustion chamber.

In this case, restarting the system 2 takes some time since each part of the gas turbine generator 2-01 has to be cooled down and fuel has to be purged. The restart is carried away according to the aforementioned startup operation.

In the system 1, when the DC/AC converter 1-03 is stopped in response to the detection of the power outage, there remains no means for controlling the voltage of the DC section. Thus, in order to let the storage battery unit execute voltage control of the DC section, the control mode of the storage battery unit is switched from the charging/discharging current control from the DC voltage control.

At the point when the control mode is switched, electric power supplied from the turbine generator 1-01 via the AC/DC converter 1-02 raises the electrical potential of the DC section; however, the storage battery unit maintains the voltage of the DC section to be constant by storing generated power in the storage battery 1-04.

When the breaker 4-04 has opened, the system 1 starts the operation of the DC/AC converter 1-03 by the AC voltage control mode and thereby supplies electric power to the load 5-02. In this case, the AC voltage of the load 5-02 is controlled by the DC/AC converter 1-03 while the voltage of the DC section is controlled by the storage battery unit, by which voltage of each part is maintained within a normal range suitable for the operation of the system.

In cases where the system 1 can not cope with all the power consumption of the load 5-02, power generation by the system 2 may be started as needed by starting up the system 2 using electric power from the system 1, or the load may be restricted so that the load power consumption can be supplied by the system 1 only.

Figure 6:
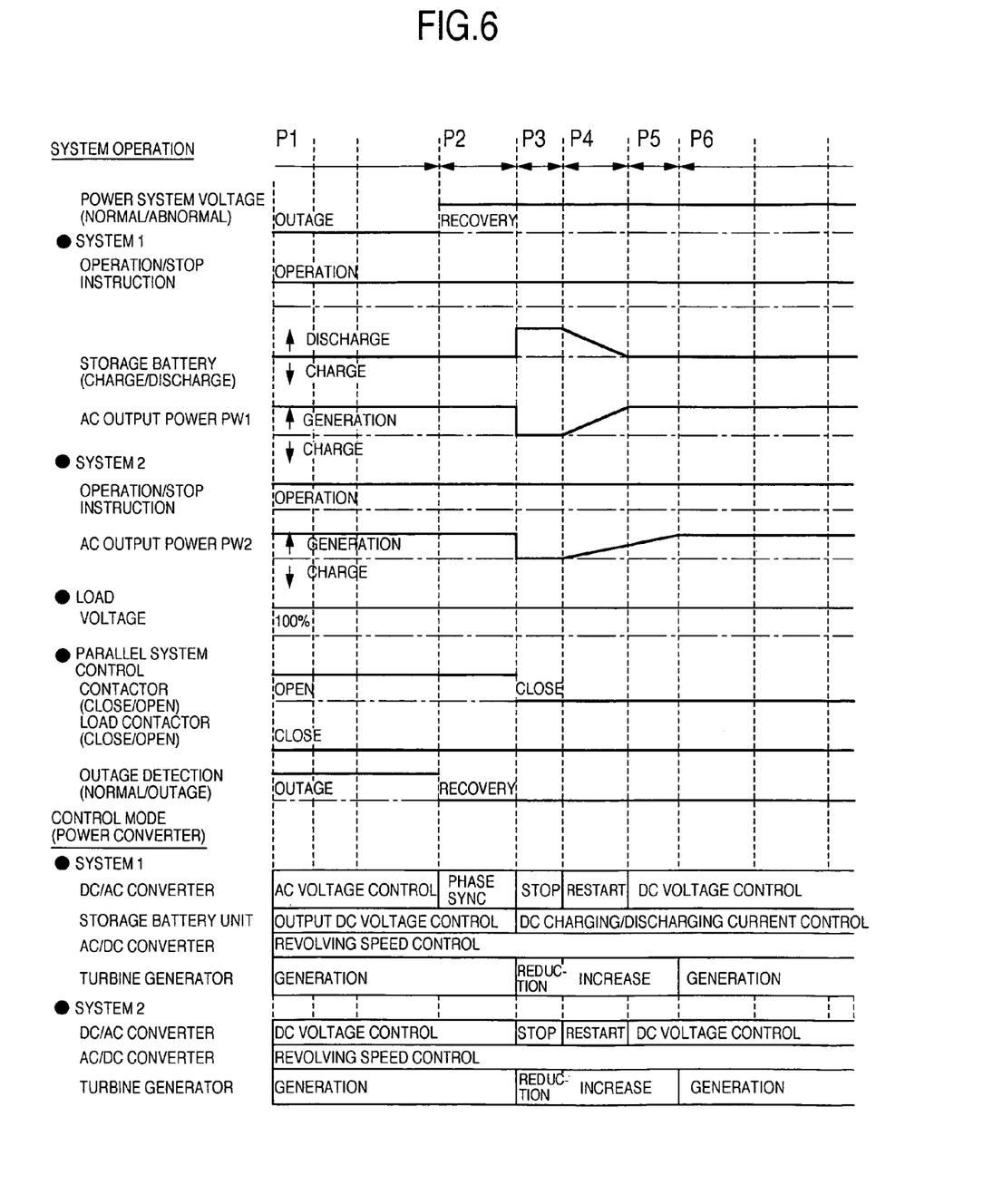
FIG. 6 is a timing chart showing the operation of the gas turbine power generation system when the system which has been cut off from the power system is reconnected to the power system.

FIG. 6 is a timing chart showing the operation of the gas turbine power generation system when the system which has been cut off from the power system 4-01 is reconnected to the power system 4-01. The phase and amplitude of the load voltage is matched with those of the power system voltage by use of the AC voltage control function and a power system phase detection function of the DC/AC converter 1-03 of the system 1.

Subsequently, the contactor at the connection to the power system 4-01 is closed, and the control modes of the DC/AC converter 1-03 and the storage battery unit including the storage battery 1-04 and the DC/DC converter 1-05 of the system 1 is switched to the DC voltage control mode and the charging/discharging current control mode respectively, without switching the system 2, by which the reconnection to the power system 4-01 becomes possible.

Meanwhile, when the parallel system includes two or more systems 1 having a storage battery unit, letting the systems execute the AC voltage control being detached from the power system 4-01 causes passage of reactive current (cross current, intersystem current) among the systems executing the AC voltage control.

To control the reactive current, two methods are possible: providing a cross current suppressor, or letting a system 1 execute the AC voltage control while letting other systems 1 execute the DC voltage control (by the DC/AC converter receiving a power generation level instruction and a charging/discharging current instruction from the system).

By the above embodiment, in case of outage of the power system 4-01, the operation mode of the gas turbine power generation system is switched to one that reduces the fuel supply to the minimum while the system having the storage battery unit stores surplus power (electricity) in its storage battery, by which stoppage caused by power outage can be eliminated and power supply to the load 5-02 can be switched smoothly.

As set forth hereinabove, by the present invention, in a power generation system including two or more systems connected in parallel, a system having a storage battery is started up first and thereafter other systems having no storage battery can be started up using electric power of the system that has already been started. Therefore, the number of expensive storage battery units can be reduced and the total cost of the power generation system can be cut down.

Further, when the power generation system is supplying electric power to the load, in a system having a storage battery, the storage battery unit executes the DC voltage control for balancing the power generation level with the power consumption of the load so as to maintain the AC voltage at a prescribed level and thereby automatically switches into charging/discharging operation, by which voltage fluctuations caused by variations in the load can be suppressed in quick response.

In case of outage of the power system, the operation mode of the power generation system is switched to one that reduces the fuel supply to the minimum while the system having the storage battery unit stores surplus power (electricity) in its storage battery, by which stoppage caused by power outage can be eliminated and power supply to the load can be switched smoothly.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power generation system comprising a plurality of unit power generation systems each of which supplies electric power generated by its generator to a load via a power converter and a breaker, wherein:

a first unit power generation system includes a first power converter having a storage battery in its DC section, and each of the other unit power generation systems includes other power converters having no storage battery in its DC section, the power generation system further comprises a controller which first starts up the first unit power generation system using electric power generated by the first power converter, and then starts up the other unit power generation systems having no storage battery using electric power generated by the first unit power generation system which has already been started up, during a startup of the power generation system when an external power system has an abnormality or no external power is available, and the controller executes AC voltage control of the first power converter while letting a charging and/or discharging unit provided to the storage battery execute DC voltage control of its power converter so as to suppress DC voltage fluctuations caused by variations in the load and maintain balance of electric power.

2. The power generation system according to claim 1, wherein the storage battery has a capacity capable of starting up the plurality of unit power generation systems at least once.

3. The power generation system according to claim 1, wherein:

the first unit power generation system includes a charging and/or discharging unit for charging and/or discharging the storage battery in the DC section of first power converter, and the power generation system further comprises a controller which switches the system to an operation mode for reducing fuel supply and controls the storage battery charging and/or discharging unit of the first unit power generation system to maintain balance between generated power and power consumption of the load in case of outage of the power generation system.

4. The power generation system according to claim 3, wherein the storage battery has a capacity capable of starting up the plurality of unit power generation systems at least once.

5. The power generation system according to claim 1, wherein:

each unit power generation system includes a gas turbine generator, an AC/DC converter connected to an output side of the gas turbine generator, a DC/AC converter connected to a DC side of the AC/DC converter, and a breaker connected to an AC side of the DC/AC converter, and the plurality of unit power generation systems are connected in parallel to be connected to a load and the external power system, and the first unit power generation including the storage battery further includes the battery charging and/or discharging unit, and the controller executes the AC voltage control of the AC side of the DC/AC converter of the first unit power generation system while letting the charging and/or discharging unit execute the DC voltage control so as to suppress DC voltage fluctuations caused by variations in the load and maintain balance of electric power.

6. The power generation system according to claim 5, wherein the storage battery has a capacity capable of starting up the plurality of unit power generation systems at least once.

7. A power generation system comprising:

a plurality of unit power generation systems for supplying electric power to a load, each unit power generation system comprising a generator which supplies electric power, a power converter and a breaker, a first one of the unit power generation systems further including a storage battery in a DC section of its power converter, each other unit power generation system including no storage battery in a DC section of its power converter; and a controller which starts up the plurality of unit power generation systems for supplying electric power to the load, wherein:

during a startup of the power generation system when an external power system has an abnormality or no external power is available, the controller: (1) first starts up the first unit power generation system using electric power generated by the power converter having the storage battery of the first unit power generation system, and (2) then starts up each other unit power generation system using electric power generated by the first unit power generation system which has already been started, and the controller executes AC voltage control of the first power converter while letting a charging and/or discharging unit provided to the storage battery execute DC voltage control of its power converter so as to suppress DC voltage fluctuations caused by variations in the load and maintain balance of electric power.

* * * * *